US012256390B2

(12) United States Patent
Huang et al.

(10) Patent No.: US 12,256,390 B2
(45) Date of Patent: Mar. 18, 2025

(54) DIFFERENT ORTHOGONAL COVER CODE MATRIX SIZES ACROSS PHYSICAL UPLINK CONTROL CHANNEL REPETITIONS

(71) Applicant: QUALCOMM Incorporated, San Diego, CA (US)

(72) Inventors: Yi Huang, San Diego, CA (US); Peter Gaal, San Diego, CA (US); Wei Yang, San Diego, CA (US); Tingfang Ji, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 664 days.

(21) Appl. No.: 17/446,565

(22) Filed: Aug. 31, 2021

(65) Prior Publication Data
US 2022/0086825 A1 Mar. 17, 2022

Related U.S. Application Data

(60) Provisional application No. 62/706,817, filed on Sep. 11, 2020.

(51) Int. Cl.
*H04W 72/21* (2023.01)
*H04L 5/00* (2006.01)
*H04L 27/26* (2006.01)

(52) U.S. Cl.
CPC ........... *H04W 72/21* (2023.01); *H04L 5/0048* (2013.01); *H04L 27/26035* (2021.01)

(58) Field of Classification Search
CPC . H04W 72/21; H04L 5/0048; H04L 27/26035
See application file for complete search history.

(56) References Cited

U.S. PATENT DOCUMENTS

2020/0404692 A1* 12/2020 Yin ..................... H04L 1/1887
2021/0298009 A1* 9/2021 Almquist ............. H04L 5/0016
2022/0124705 A1* 4/2022 Shin ..................... H04L 5/0053

OTHER PUBLICATIONS

R1-1806261 Ericsson "NR-U PUCCH Design" 3GPP WG1 #93 Busan May 21-25, 2018. (Year: 2018).*

* cited by examiner

*Primary Examiner* — Basil Ma
(74) *Attorney, Agent, or Firm* — Harrity & Harrity, LLP

(57) ABSTRACT

Various aspects of the present disclosure generally relate to wireless communication. In some aspects, a user equipment (UE) may generate a plurality of physical uplink control channel (PUCCH) repetitions of different lengths using vectors of orthogonal cover code (OCC) matrices that differ in size across two or more of the plurality of PUCCH repetitions. The UE may transmit the plurality of PUCCH repetitions. Numerous other aspects are provided.

30 Claims, 14 Drawing Sheets

400

Repetition 1

Repetition 2

Repetition K

DIFFERENT ORTHOGONAL COVER CODE MATRIX SIZES ACROSS PHYSICAL UPLINK CONTROL CHANNEL REPETITIONS

CROSS-REFERENCE TO RELATED APPLICATION

This patent application claims priority to U.S. Provisional Patent Application No. 62/706,817, filed on Sep. 11, 2020, entitled "DIFFERENT ORTHOGONAL COVER CODE MATRIX SIZES ACROSS PHYSICAL UPLINK CONTROL CHANNEL REPETITIONS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for different orthogonal cover code matrix sizes across physical uplink control channel repetitions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication performed by a user equipment (UE) includes generating a plurality of physical uplink control channel (PUCCH) repetitions of different lengths using vectors of orthogonal cover code (OCC) matrices that differ in size across two or more of the plurality of PUCCH repetitions, and transmitting the plurality of PUCCH repetitions.

In some aspects, a method of wireless communication performed by a base station includes receiving, from a UE, a plurality of PUCCH repetitions of different lengths, and decoding the plurality of PUCCH repetitions using vectors of OCC matrices that differ in size across two or more of the plurality of PUCCH repetitions.

In some aspects, a UE for wireless communication includes a memory and one or more processors coupled with the memory, the one or more processors configured to generate a plurality of PUCCH repetitions of different lengths using vectors of OCC matrices that differ in size across two or more of the plurality of PUCCH repetitions, and transmit the plurality of PUCCH repetitions.

In some aspects, a base station for wireless communication includes a memory and one or more processors coupled with the memory, the one or more processors configured to receive, from a UE, a plurality of PUCCH repetitions of different lengths, and decode the plurality of PUCCH repetitions using vectors of OCC matrices that differ in size across two or more of the plurality of PUCCH repetitions.

In some aspects, a non-transitory computer-readable medium storing a set of instructions for wireless communication includes one or more instructions that, when executed by one or more processors of a UE, cause the UE to generate a plurality of PUCCH repetitions of different lengths using vectors of OCC matrices that differ in size across two or more of the plurality of PUCCH repetitions, and transmit the plurality of PUCCH repetitions.

In some aspects, a non-transitory computer-readable medium storing a set of instructions for wireless communication includes one or more instructions that, when executed by one or more processors of a base station, cause the base station to receive, from a UE, a plurality of PUCCH repetitions of different lengths, and decode the plurality of PUCCH repetitions using vectors of OCC matrices that differ in size across two or more of the plurality of PUCCH repetitions.

In some aspects, an apparatus for wireless communication includes means for generating a plurality of PUCCH repetitions of different lengths using vectors of OCC matrices that differ in size across two or more of the plurality of PUCCH repetitions, and means for transmitting the plurality of PUCCH repetitions.

In some aspects, an apparatus for wireless communication includes means for receiving, from a UE, a plurality of PUCCH repetitions of different lengths, and means for decoding the plurality of PUCCH repetitions using vectors of OCC matrices that differ in size across two or more of the plurality of PUCCH repetitions.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
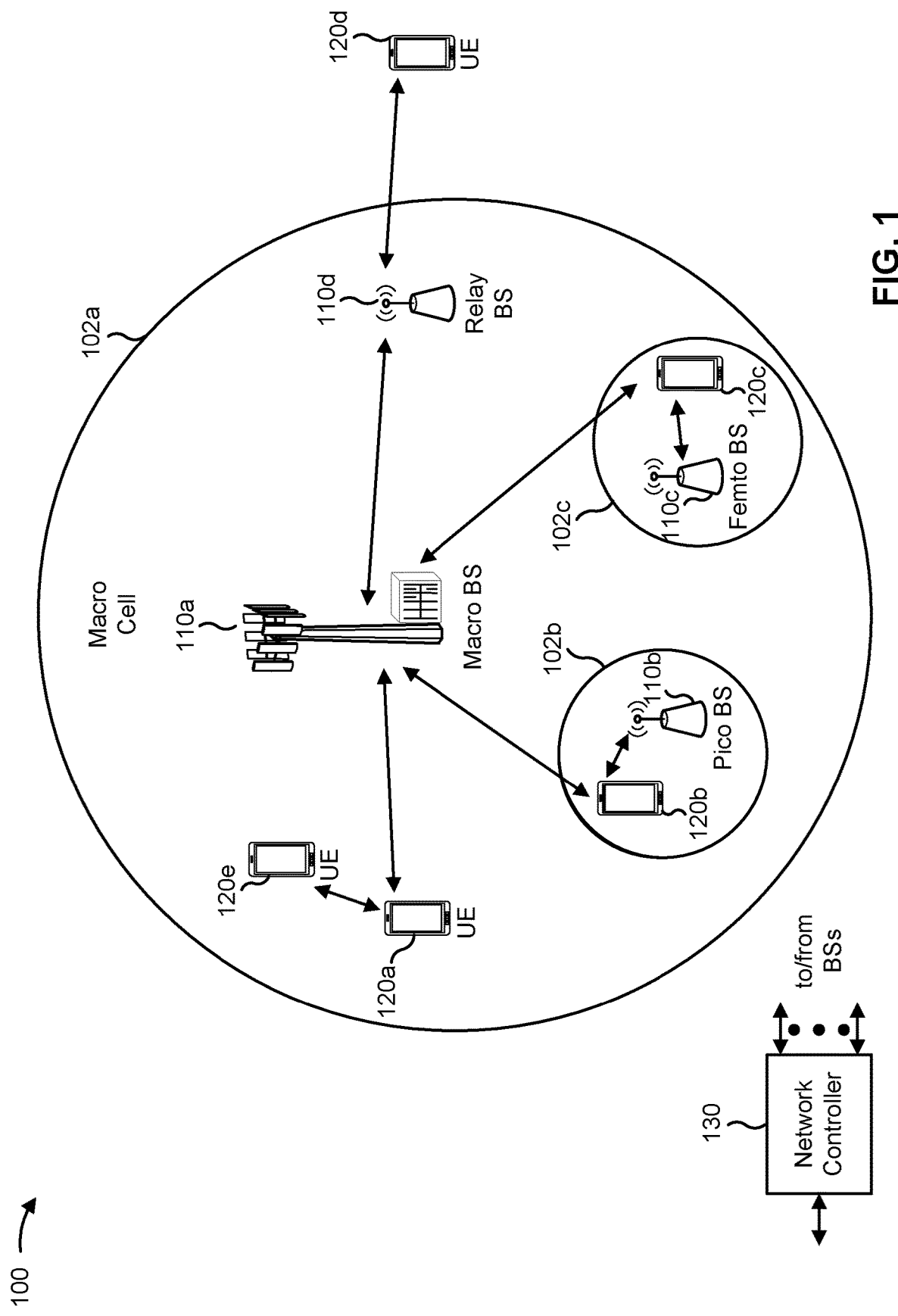
FIG. 1 is a diagram illustrating an example of a wireless network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6

GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
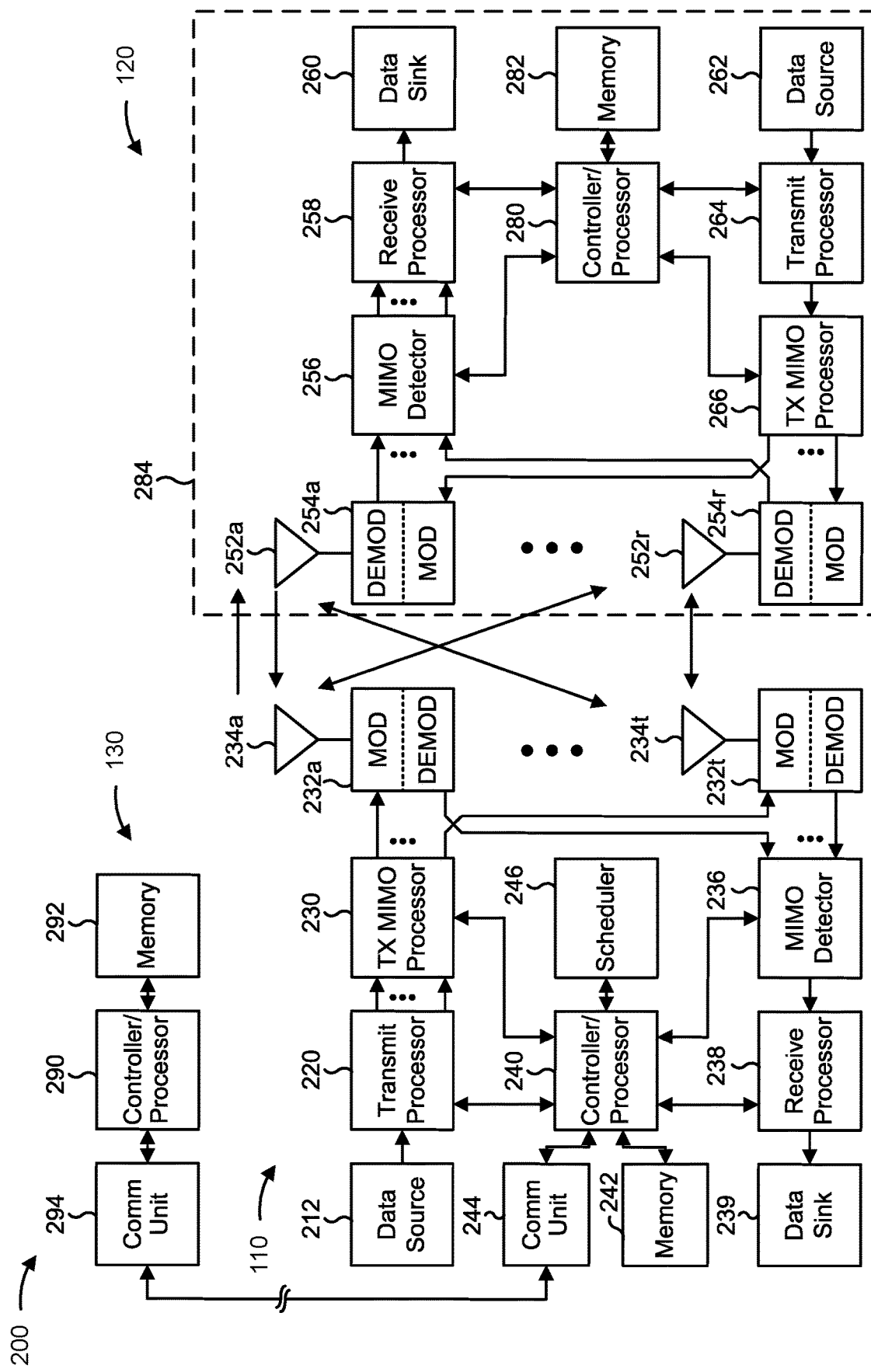
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-14).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-14).

Controller/processor 240 of base station 110, controller/processor 280 of UE 120, and/or any other component(s) of FIG. 2 may perform one or more techniques associated with different orthogonal cover code (OCC) matrix sizes across physical uplink control channel (PUCCH) repetitions, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, and/or base station 110 to perform or direct operations of, for example, process 1100 of FIG. 11, process 1200 of FIG. 12, and/or other processes as described herein. In some aspects, executing instructions may include running the instructions, converting the instructions, compiling the instructions, and/or interpreting the instructions, among other examples.

In some aspects, UE 120 includes means for generating a plurality of PUCCH repetitions of different lengths using vectors of OCC matrices that differ in size across two or more of the plurality of PUCCH repetitions, and/or means for transmitting the plurality of PUCCH repetitions. The means for UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, UE 120 includes means for applying a first vector of a first OCC matrix of a first size to demodulation reference signal (DMRS) symbols of a first PUCCH repetition, and a second vector of a second OCC matrix of a second size to uplink control information (UCI) symbols of the first PUCCH repetition, and/or means for applying a third vector of a third OCC matrix of a third size, different than the first size, to DMRS symbols of a second PUCCH repetition, and a fourth vector of a fourth OCC matrix of a fourth size to UCI symbols of the second PUCCH repetition, and transmitting the plurality of PUCCH repetitions includes transmitting the first PUCCH repetition and the second PUCCH repetition.

In some aspects, UE 120 includes means for receiving the index value identifying the first vector from a base station.

In some aspects, UE 120 includes means for determining a maximum quantity of vectors in the first OCC matrix that may be selected for application to the DMRS symbols of the first PUCCH repetition, based at least in part on a minimum size among the first size and the third size.

In some aspects, UE 120 includes means for selecting a subset of vectors of the first OCC matrix to form a first reduced OCC matrix, where a quantity of the subset of vectors is no greater than the maximum quantity of vectors that may be selected for application to the DMRS symbols.

In some aspects, UE 120 includes means for determining a quantity of vectors in the second OCC matrix that may be selected for application to the UCI symbols of the first PUCCH repetition based at least in part on a minimum size among the second size and the fourth size.

In some aspects, base station 110 includes means for receiving, from a UE, a plurality of PUCCH repetitions of different lengths, and/or means for decoding the plurality of PUCCH repetitions using vectors of OCC matrices that differ in size across two or more of the plurality of PUCCH repetitions. The means for base station 110 to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, base station 110 includes means for determining a first vector of a first OCC matrix of a first size for decoding DMRS symbols of the first PUCCH repetition, and a second vector of a second OCC matrix of a second size for decoding UCI symbols of the first PUCCH repetition, and/or means for determining a third vector of a third OCC matrix of a third size, different than the first size, for decoding DMRS symbols of the second PUCCH repetition, and a fourth vector of a fourth OCC matrix of a fourth size for decoding UCI symbols of the second PUCCH repetition.

In some aspects, base station 110 includes means for transmitting the index value identifying the first vector to the UE.

In some aspects, base station 110 includes means for determining a maximum quantity of vectors in the first OCC matrix that may be selected for decoding the DMRS symbols of the first PUCCH repetition based at least in part on a minimum size among the first size and the third size.

In some aspects, base station 110 includes means for selecting a subset of vectors of the first OCC matrix to form a first reduced OCC matrix, where a quantity of the subset of vectors is no greater than the maximum quantity of vectors that may be selected for decoding the DMRS symbols.

In some aspects, base station 110 includes means for determining a maximum quantity of vectors in the first OCC matrix that may be selected for application to the DMRS symbols of the first PUCCH repetition, based at least in part on one or more SFIs.

In some aspects, base station 110 includes means for determining a quantity of vectors in the second OCC matrix that may be selected for decoding the UCI symbols of the first PUCCH repetition based at least in part on a minimum size among the second size and the fourth size.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
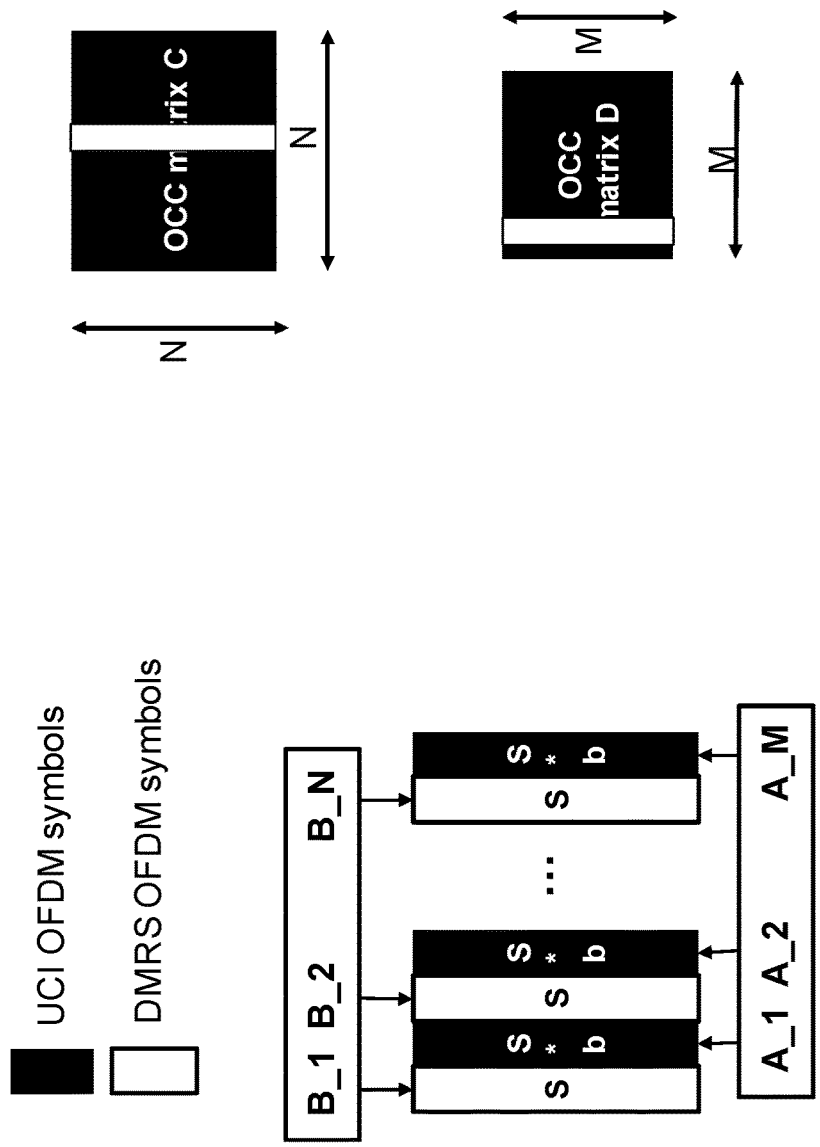
FIG. 3 is a diagram illustrating an example of a physical uplink control channel (PUCCH) format, in accordance with the present disclosure.

FIG. 3 is a diagram illustrating an example 300 of a PUCCH format, in accordance with the present disclosure.

A UE may transmit UCI and DMRSs to a base station on a PUCCH in order for the base station to measure DMRSs and use information in the UCI to schedule transmissions by the UE. The PUCCH may carry UCI and DMRSs in different formats. Example 300 shows a PUCCH format 1, where 1 or 2 bits are transmitted as a payload with 4-14 OFDM symbols. For a given cell-specific sequence S (e.g., length of 12 symbols), the UE may transmit 1 or 2 bits payload b for DMRS as sequence S on even OFDM symbols and as sequence S modulated by payload b on odd OFDM symbols. For binary phase-shift keying (BPSK) modulation, b may be a 1 bit payload. For quadrature PSK (QPSK) modulation, b may be a 2 bit payload.

An OCC matrix may be used to support multiple UEs that share the same time frequency resource. Each UE may apply a particular vector (column of entries) of the OCC matrix, and the base station may associate UEs with OCC vectors. For example, one OCC vector may be drawn from an OCC matrix (vector B drawn from OCC matrix C shown in FIG. 3) and applied to DMRS OFDM symbols. Another OCC vector may be drawn from another OCC matrix (vector A from OCC matrix D) and applied to UCI symbols. In example 300, N is a quantity of DMRS OFDM symbols, and M is a quantity of UCI OFDM symbols. An OCC matrix may be any suitable type of orthogonal matrix, such as a discrete Fourier transform (DFT) matrix.

As indicated above, FIG. 3 is provided as an example. Other examples may differ from what is described with regard to FIG. 3.

Figure 4:
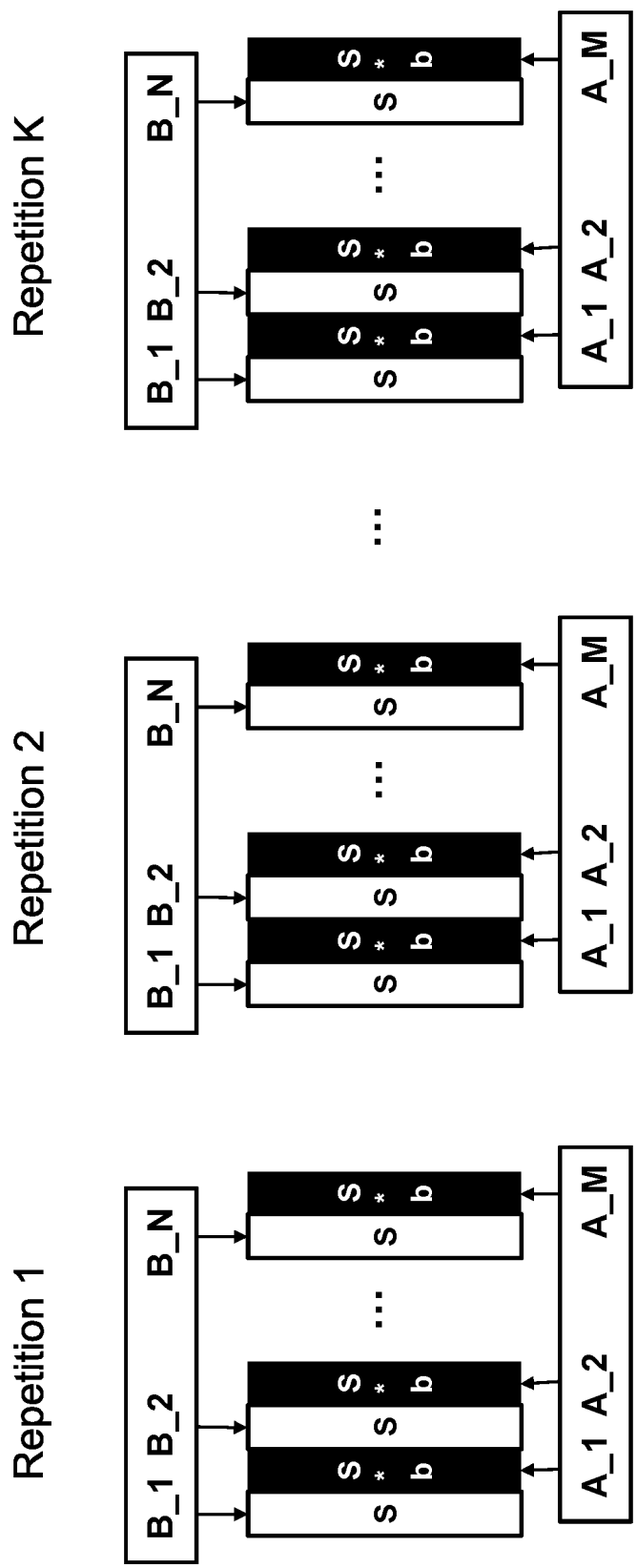
FIG. 4 is a diagram illustrating an example of PUCCH repetitions, in accordance with the present disclosure.

FIG. 4 is a diagram illustrating an example 400 of PUCCH repetitions, in accordance with the present disclosure.

A UE may repeat the same message a certain quantity of times on a PUCCH to improve reliability. Each PUCCH repetition may have the same quantity of times, or the same length. Example 400 shows a first repetition and a second repetition, up to repetition K, all of which have the same length. Each repetition in example 400 may have N DMRS symbols and M UCI symbols. M and N may be identical across all repetitions.

As indicated above, FIG. 4 is provided as an example. Other examples may differ from what is described with regard to FIG. 4.

Figure 5:
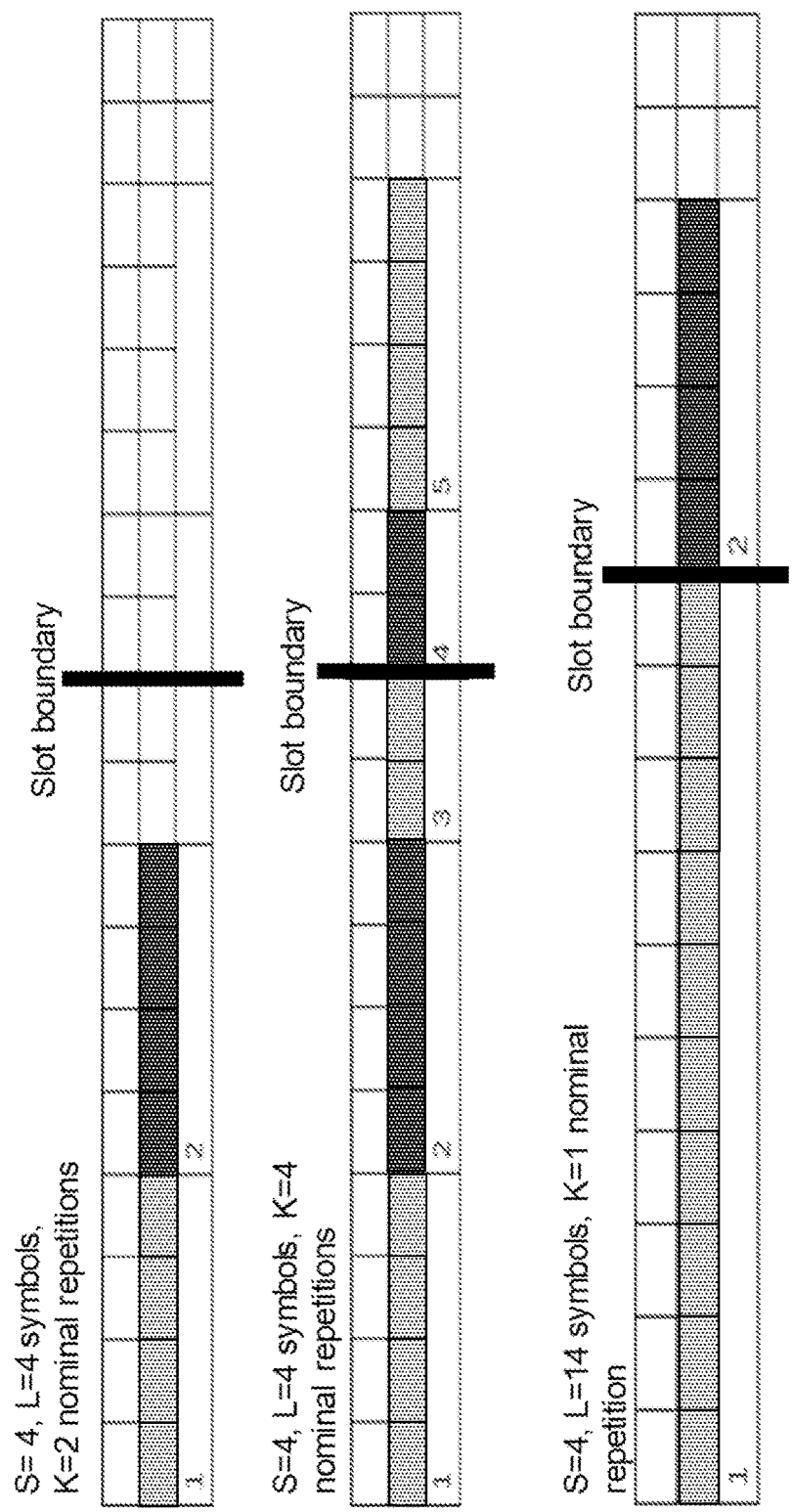
FIG. 5 is a diagram illustrating an example of PUCCH repetitions of different lengths, in accordance with the present disclosure.

FIG. 5 is a diagram illustrating an example 500 of PUCCH repetitions of different lengths, in accordance with the present disclosure.

In some aspects, PUCCH repetitions may be different lengths. This may be a result of slot boundaries. Example 500 shows three groups of repetitions: a top group, a middle group, and a bottom group. The top group shows two repetitions, where a first repetition has a length L of 4 symbols and a second repetition has a length S of 4 symbols. The first slot has a quantity K of 2 repetitions. The middle group has two repetitions of 4 symbols each, but due to a slot boundary, the slot has a third repetition of 2 symbols. The next slot has a fourth repetition of 2 symbols and a fifth repetition of 4 symbols. The bottom group has one long repetition of 14 symbols that fills up the first slot. The second slot starts with a repetition of 4 symbols. In other words, because of slot boundaries, repetitions may be of different lengths.

As indicated above, FIG. 5 is provided as an example. Other examples may differ from what is described with regard to FIG. 5.

Figure 6:
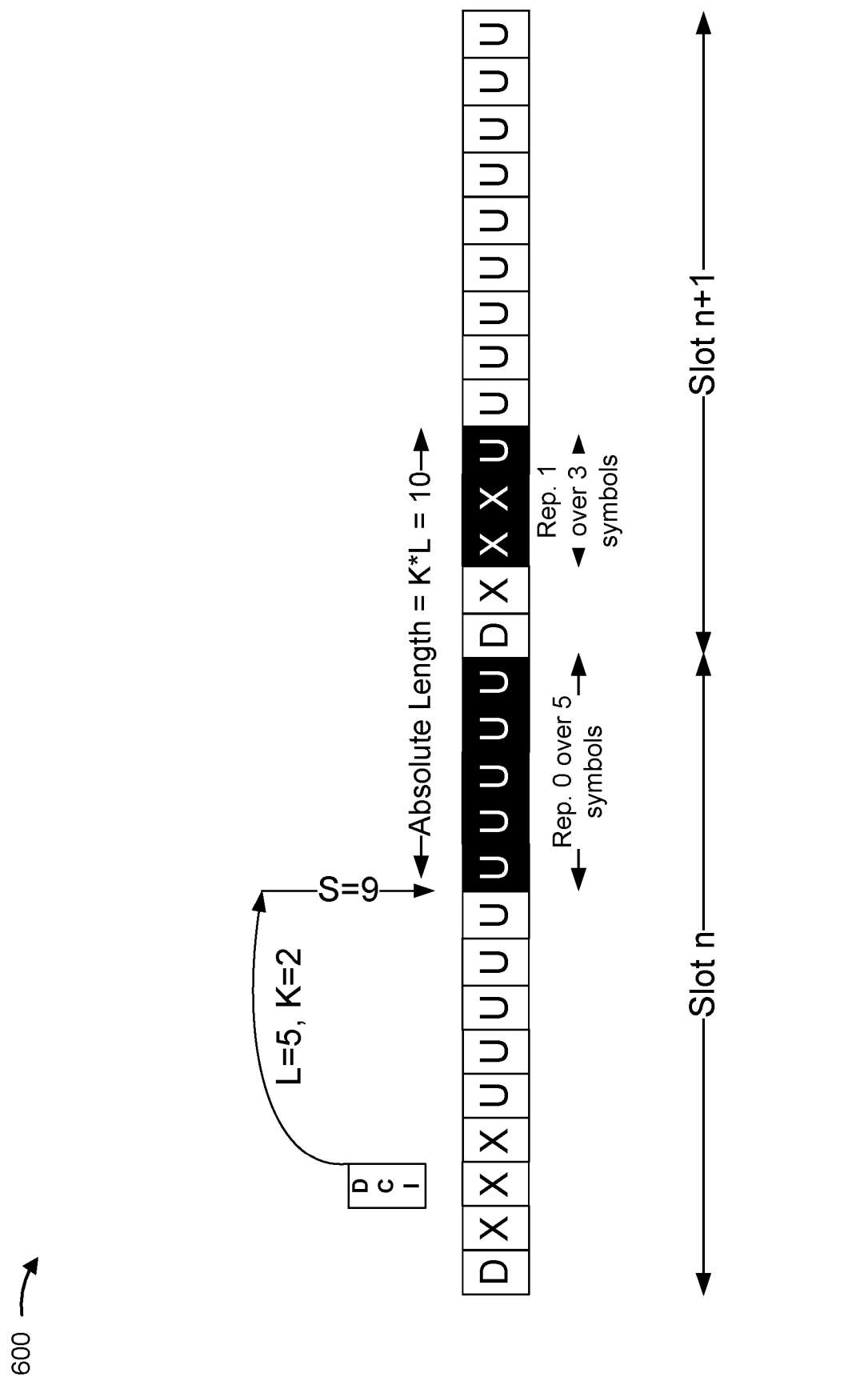
FIG. 6 is a diagram illustrating an example of PUCCH repetitions of different lengths, in accordance with the present disclosure.

FIG. 6 is a diagram illustrating an example 600 of PUCCH repetitions of different lengths, in accordance with the present disclosure.

In some aspects, PUCCH repetitions may be of different lengths because of segmentation. Example 600 shows downlink control information (DCI) that indicates a quantity K of two repetitions, each being a length L of 5 symbols, for an absolute length of 10 symbols for both repetitions. The first repetition is to begin after 9 symbols.

Example 600 shows that the first repetition for the PUCCH is 5 uplink (U) symbols, but a next symbol is a downlink (D) symbol from the base station. The downlink symbol is followed by a gap symbol (X), and the downlink and gap symbols break up the two PUCCH repetitions. The second repetition is only 3 symbols, which is a different length than the first repetition. The different length repetitions may be of a PUCCH repetition Type B format, similar to a physical uplink shared channel (PUSCH) Type B format.

As indicated above, FIG. 6 is provided as an example. Other examples may differ from what is described with regard to FIG. 6.

Figure 7:
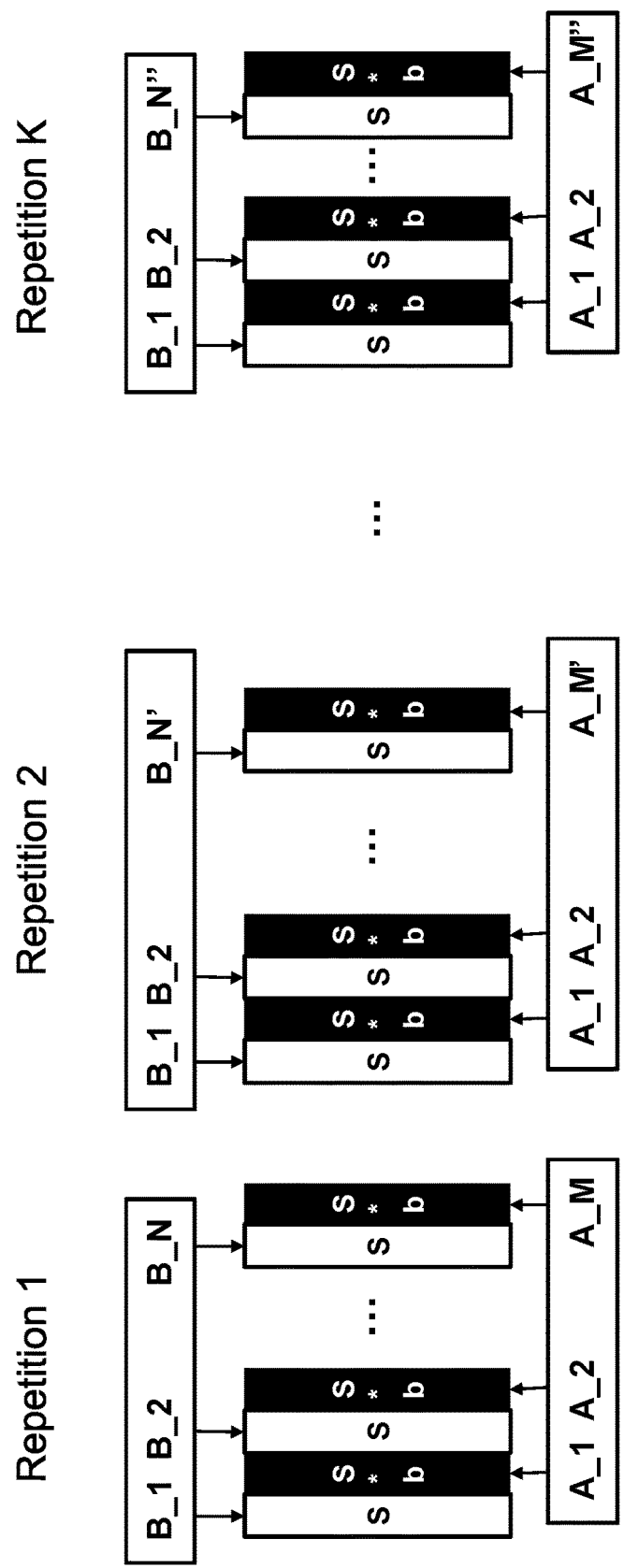
FIG. 7 is a diagram illustrating an example of PUCCH repetitions of different lengths, in accordance with the present disclosure.

FIG. 7 is a diagram illustrating an example 700 of PUCCH repetitions of different lengths, in accordance with the present disclosure.

Example 700 shows repetitions of different lengths. For example, repetition 2 may be longer than repetition 1. Repetition 3 may be shorter than repetition 1 and repetition 2. However, OCC matrices may have been configured for PUCCH repetitions of the same length and thus the OCC matrices are the same size across PUCCH repetitions. If a PUCCH repetition length is greater than a corresponding OCC matrix size, invalid OCC matrix vectors may cause encoding errors and failed transmissions. As a result, a UE may waste power, processing resources, and signaling resources with retransmissions. If a PUCCH repetition length is smaller than an OCC matrix size, the OCC matrix may waste memory and processing resources.

As indicated above, FIG. 7 is provided as an example. Other examples may differ from what is described with regard to FIG. 7.

Figure 8:
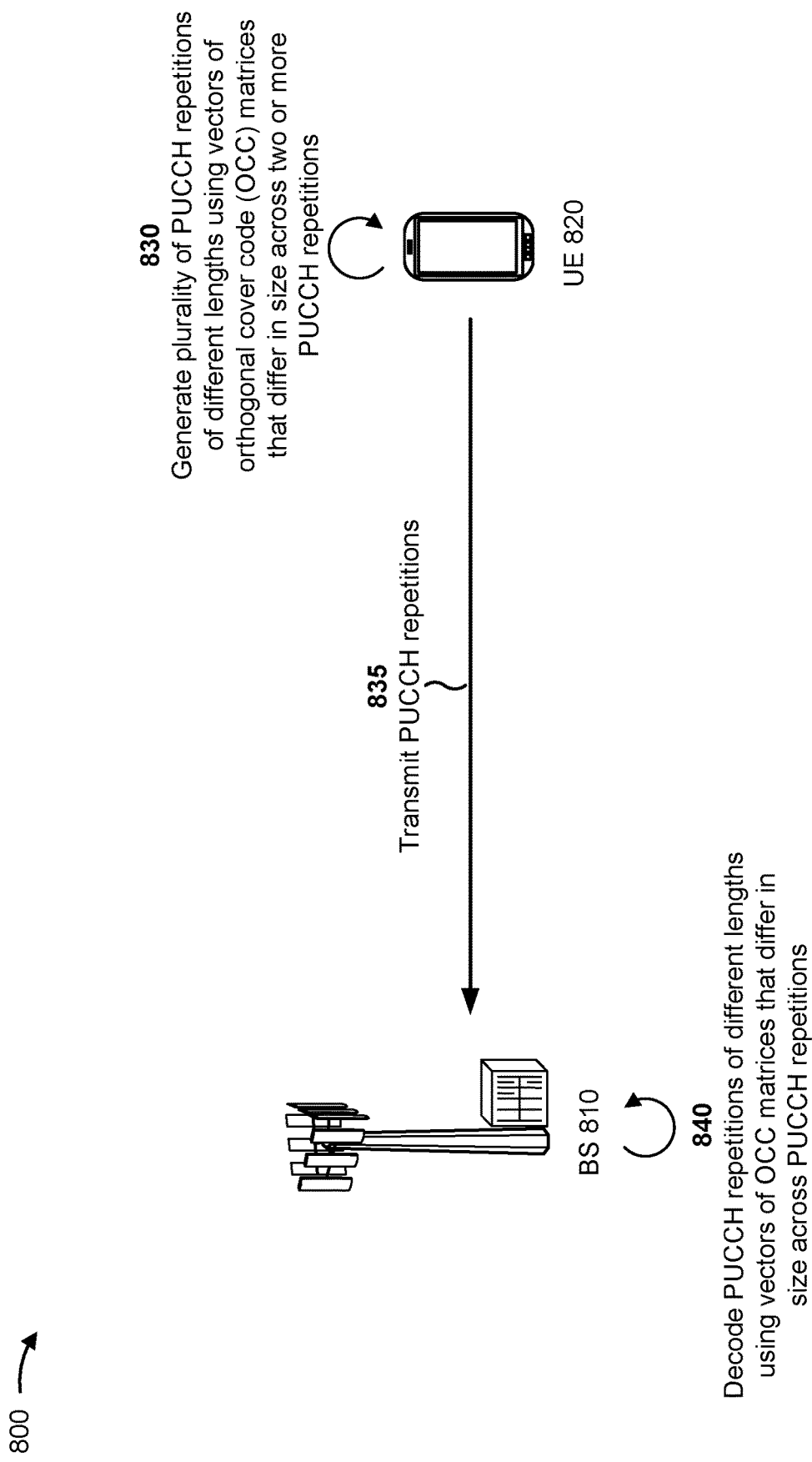
FIG. 8 is a diagram illustrating an example of PUCCH repetitions of different lengths using vectors of orthogonal cover code (OCC) matrices that differ in size, in accordance with the present disclosure.

FIG. 8 is a diagram illustrating an example 800 of PUCCH repetitions of different lengths using vectors of OCC matrices that differ in size, in accordance with the present disclosure. As shown in FIG. 8, example 800 includes communication between BS 810 (e.g., a BS 110 depicted in FIGS. 1 and 2) and a UE 820 (e.g., a UE 120 depicted in FIGS. 1 and 2). In some aspects, BS 810 and UE 820 may be included in a wireless network, such as wireless network 100. BS 810 and UE 820 may communicate on a wireless access link, which may include an uplink and a downlink.

According to various aspects described herein, a UE scheduled to use PUCCH repetitions of different lengths may use OCC matrices that differ in size across PUCCH repetitions, or more specifically, vectors of OCC matrices that differ in size across PUCCH repetitions. A PUCCH repetition length and an OCC matrix size may match for varying PUCCH repetition lengths. As a result of matching OCC matrix size with PUCCH repetition length, the UE may conserve power, memory, processing resources, and signaling resources otherwise consumed by mismatched OCC matrix sizes and by retransmissions.

As shown in example 800, and by reference number 830, UE 820 may generate a plurality of PUCCH repetitions of different lengths using vectors of OCC matrices that differ in size across at least two of the PUCCH repetitions. For example, UE 820 may select a vector from one OCC matrix to apply to DMRS symbols of a first repetition, and select a vector from a larger OCC matrix to apply to DMRS symbols of a second repetition that is longer than the first repetition. UE 820 may also use separate OCC matrices for applying vectors to UCI. In some aspects, UE 820 may determine a PUCCH repetition length and/or an OCC matrix size based at least in part on a slot format indicator (SFI). UE 820 may determine usable symbols according to the SFI or an associated SFI pattern, such as indicated by InvalidSymbolPattern. OCC matrices of differing size may enable UE 820 more scheduling flexibility with respects to SFI patterns.

As shown by reference number 835, UE 820 may transmit the PUCCH repetitions to BS 810. BS 810 may have configured UE 820 with the OCC matrices (to use PUCCH repetitions of different lengths) and may determine which OCC matrices and vectors to apply to decode the PUCCH repetitions for a particular UE. As shown by reference number 840, BS 810 may decode the PUCCH repetitions to obtain the DMRSs and the UCI for multiple UEs. BS 810 may use measurements of the DMRSs and information from the UCI to schedule future communications for the multiple UEs.

As indicated above, FIG. 8 is provided as an example. Other examples may differ from what is described with regard to FIG. 8.

Figure 9:
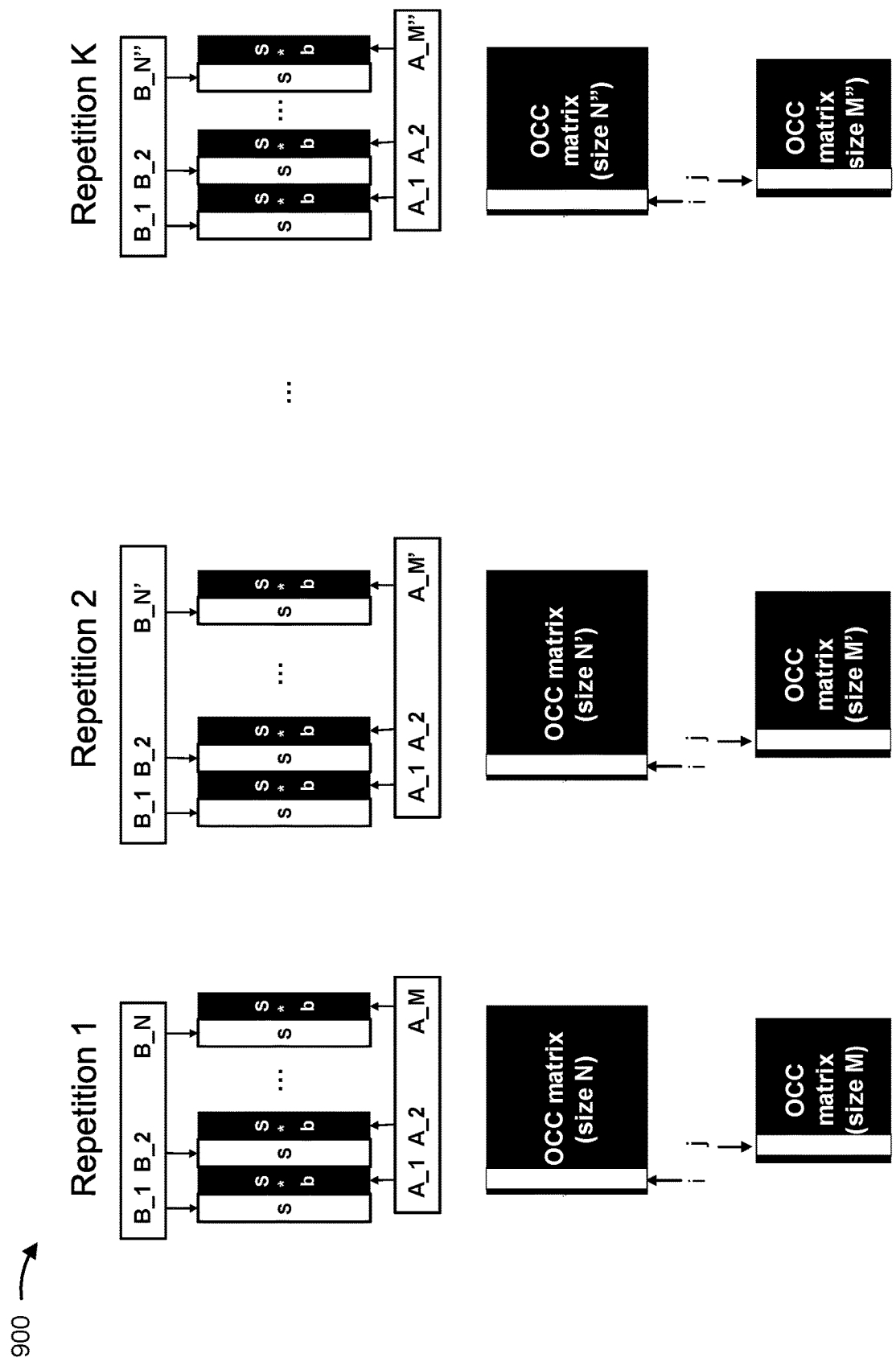
FIG. 9 is a diagram illustrating an example of PUCCH repetitions of different lengths using vectors of OCC matrices that differ in size, in accordance with the present disclosure.

FIG. 9 is a diagram illustrating an example 900 of PUCCH repetitions of different lengths using vectors of OCC matrices that differ in size, in accordance with the present disclosure. Example 900 shows PUCCH repetitions of different lengths. For example, repetition 2 is longer than repetition 1, and repetition K is shorter than repetition 1.

Example 900 also shows OCC matrices of different sizes. An OCC matrix for applying a multi-UE vector i to DMRS symbols in PUCCH repetition 2 may be larger than an OCC matrix for DMRS symbols in PUCCH repetition 1 (N'>N). Likewise, an OCC matrix for applying multiuser vector j to UCI symbols in PUCCH repetition 2 may be larger than an OCC matrix for UCI symbols in PUCCH repetition 1 (M'>M).

A base station (e.g., gNB) may signal which index of the OCC matrices to use for application to OFDM symbols in the PUCCH repetition. In some aspects, the base station may signal an index i that is common across OCC matrices for DMRS symbols of the PUCCH repetitions, regardless of a size of each OCC matrix. The base station may also signal an index j that is common across OCC matrices for UCI symbols of the PUCCH repetitions. In this way, index signaling may be efficient. In some aspects, the gNB may signal a single index i that applies to vectors for OCC matrices for both DMRS and UCI.

As indicated above, FIG. 9 is provided as an example. Other examples may differ from what is described with regard to FIG. 9.

Figure 10:
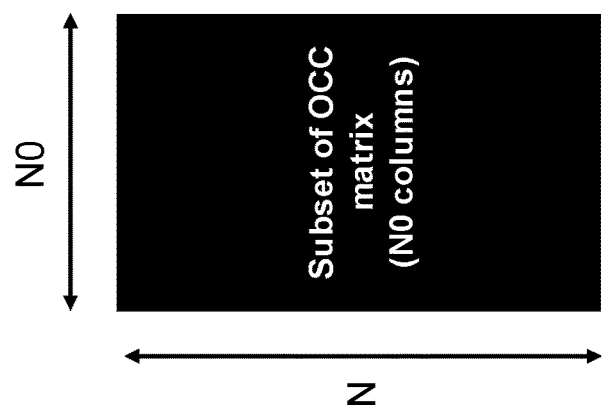
FIG. 10 is a diagram illustrating an example of a subset of an OCC matrix, in accordance with the present disclosure.
Figure 10:
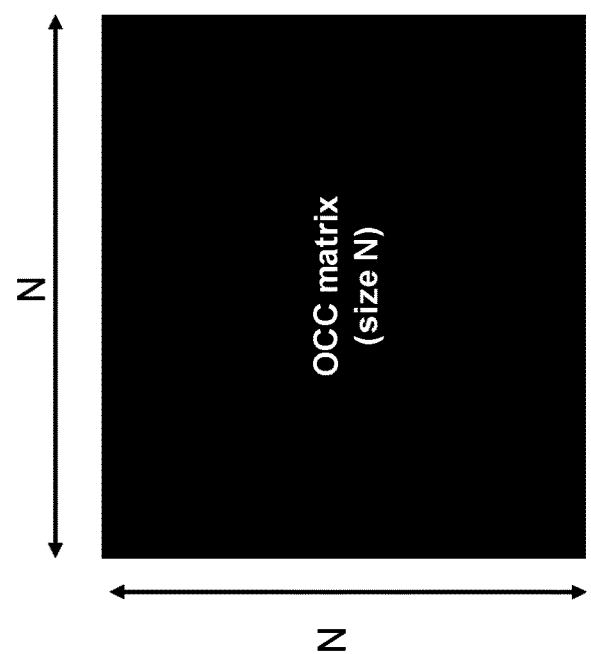

FIG. 10 is a diagram illustrating an example 1000 of a subset of an OCC matrix, in accordance with the present disclosure.

In some aspects, a UE (or a gNB) may determine a cardinality of index i (or indices i and j). The cardinality may indicate a quantity of vectors that are chosen from an OCC matrix. The UE may determine the cardinality of index i to be based at least in part on a smallest of the OCC matrix sizes for DMRS, such as a minimum of {N, N', . . . , N"}. The UE may determine the cardinality of index j to be based at least in part on a smallest of the OCC matrix sizes for UCI, such as a minimum of {M, M', . . . , M"}. In other words, a maximum quantity of vectors to be selected from any OCC matrix may be no greater than the quantity of vectors found in the smallest OCC matrix. If a common index i is used for DMRS and UCI, then the cardinality of index i may be a minimum of {N, N', . . . , N", M, M', . . . , M"}.

In some aspects, a UE (or a gNB) may select a subset of vectors from an original OCC matrix for a PUCCH repetition to form a reduced OCC matrix for the PUCCH repetition. Example 1000 shows the original OCC matrix of N columns and a reduced OCC matrix of N0 (N zero) columns. N0 may represent a minimum cardinality of index i (or j). In this way, unused vectors in an oversized OCC matrix may not be a waste of resources. In some aspects, a cardinality of an OCC matrix and/or a subset of vectors for a reduced OCC matrix may be based at least in part on an SFI.

In some aspects, the UE (or gNB) may select the subset of vectors from a localized or contiguous subsampling. For example, the subset may include N0 contiguous columns to be the reduced OCC matrix. The contiguous columns may be the first N0 columns or the gNB may signal a start column for the contiguous columns.

In some aspects, the UE (or gNB) may select the subset of vectors from a distributed subsampling. Vectors may be spaced apart, and a spacing between each vector may be based at least in part on N divided by N0. For example, the UE may, from a start vector signaled by the gNB, select a next vector that is a quantity x vectors after the last selected vector, up to N0 vectors. Gap quantity x may be a floor (round down) or a ceiling (round up) of N/N0.

While operations are discussed with respect to PUCCH repetitions, alternatively, or additionally, some of the aspects described herein may also apply to PUSCH repetitions and associated reference signals, control information, and/or data.

As indicated above, FIG. 10 is provided as an example. Other examples may differ from what is described with regard to FIG. 10.

Figure 11:
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., a UE 120 depicted in FIGS. 1-2, UE 820 depicted in FIG. 8) performs operations associated with different OCC matrix sizes across PUCCH repetitions.

As shown in FIG. 11, in some aspects, process 1100 may include generating a plurality of PUCCH repetitions of different lengths using vectors of OCC matrices that differ in size across two or more of the plurality of PUCCH repetitions (block 1110). For example, the UE (e.g., using generation component 1308 depicted in FIG. 13) may generate a plurality of PUCCH repetitions of different lengths using vectors of OCC matrices that differ in size across two or more of the plurality of PUCCH repetitions, as described above.

As further shown in FIG. 11, in some aspects, process 1100 may include transmitting the plurality of PUCCH repetitions (block 1120). For example, the UE (e.g., using transmission component 1304 depicted in FIG. 13) may transmit the plurality of PUCCH repetitions, as described above.

Process 1100 may include additional aspects, such as any single aspect or any combination of aspects described below and/or in connection with one or more other processes described elsewhere herein.

In a first aspect, generating the plurality of PUCCH repetitions includes applying a first vector of a first OCC matrix of a first size to DMRS symbols of a first PUCCH repetition, and a second vector of a second OCC matrix of a second size to UCI symbols of the first PUCCH repetition, and applying a third vector of a third OCC matrix of a third size, different than the first size, to DMRS symbols of a second PUCCH repetition, and a fourth vector of a fourth OCC matrix of a fourth size to UCI symbols of the second PUCCH repetition, and transmitting the plurality of PUCCH repetitions includes transmitting the first PUCCH repetition and the second PUCCH repetition.

In a second aspect, alone or in combination with the first aspect, an index value identifying the first vector of the first OCC matrix and an index value identifying the third vector of the third OCC matrix are the same.

In a third aspect, alone or in combination with one or more of the first and second aspects, process 1100 includes receiving the index value identifying the first vector from a base station.

In a fourth aspect, alone or in combination with one or more of the first through third aspects, an index value identifying the second vector of the second OCC matrix and an index value identifying the fourth vector of the fourth OCC matrix are the same.

In a fifth aspect, alone or in combination with one or more of the first through fourth aspects, a same index value, received from a base station, identifies the first vector, the second vector, the third vector, and the fourth vector.

In a sixth aspect, alone or in combination with one or more of the first through fifth aspects, process 1100 includes determining a maximum quantity of vectors in the first OCC matrix that may be selected for application to the DMRS symbols of the first PUCCH repetition, based at least in part on a minimum size among the first size and the third size.

In a seventh aspect, alone or in combination with one or more of the first through sixth aspects, process 1100 includes selecting a subset of vectors of the first OCC matrix to form a first reduced OCC matrix, where a quantity of the subset of vectors is no greater than the maximum quantity of vectors that may be selected for application to the DMRS symbols.

In an eighth aspect, alone or in combination with one or more of the first through seventh aspects, the subset of vectors are contiguous vectors in the first OCC matrix.

In a ninth aspect, alone or in combination with one or more of the first through eighth aspects, selecting the subset of vectors includes selecting each vector in the first OCC matrix according to a distributed pattern, and a spacing between vectors in the distributed pattern is based at least in part on a total quantity of vectors in the first OCC matrix divided by the maximum quantity of vectors that may be selected for application to the DMRS symbols.

In a tenth aspect, alone or in combination with one or more of the first through ninth aspects, process 1100 includes determining a maximum quantity of vectors in the first OCC matrix that may be selected for application to the DMRS symbols of the first PUCCH repetition, based at least in part on one or more SFIs.

In an eleventh aspect, alone or in combination with one or more of the first through tenth aspects, a maximum quantity of vectors in the second OCC matrix that may be selected for application to the UCI symbols of the first PUCCH repetition is equal to the maximum quantity of vectors in the first OCC matrix that may be selected for application to the DMRS symbols.

In a twelfth aspect, alone or in combination with one or more of the first through eleventh aspects, process 1100 includes determining a quantity of vectors in the second OCC matrix that may be selected for application to the UCI symbols of the first PUCCH repetition based at least in part on a minimum size among the second size and the fourth size.

In a thirteenth aspect, alone or in combination with one or more of the first through twelfth aspects, using vectors of OCC matrices that differ in size across two or more of the plurality of PUCCH repetitions includes using vectors of OCC matrices that differ in size across the two or more of the plurality of PUCCH repetitions in connection with receiving an indication from a base station to use vectors of OCC matrices that differ in size across two or more of the plurality of PUCCH repetitions.

In a fourteenth aspect, alone or in combination with one or more of the first through thirteenth aspects, at least one of the OCC matrices is a DFT matrix.

In a fifteenth aspect, alone or in combination with one or more of the first through fourteenth aspects, generating the plurality of PUCCH repetitions includes generating the plurality of PUCCH repetitions based at least in part on one or more SFIs.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
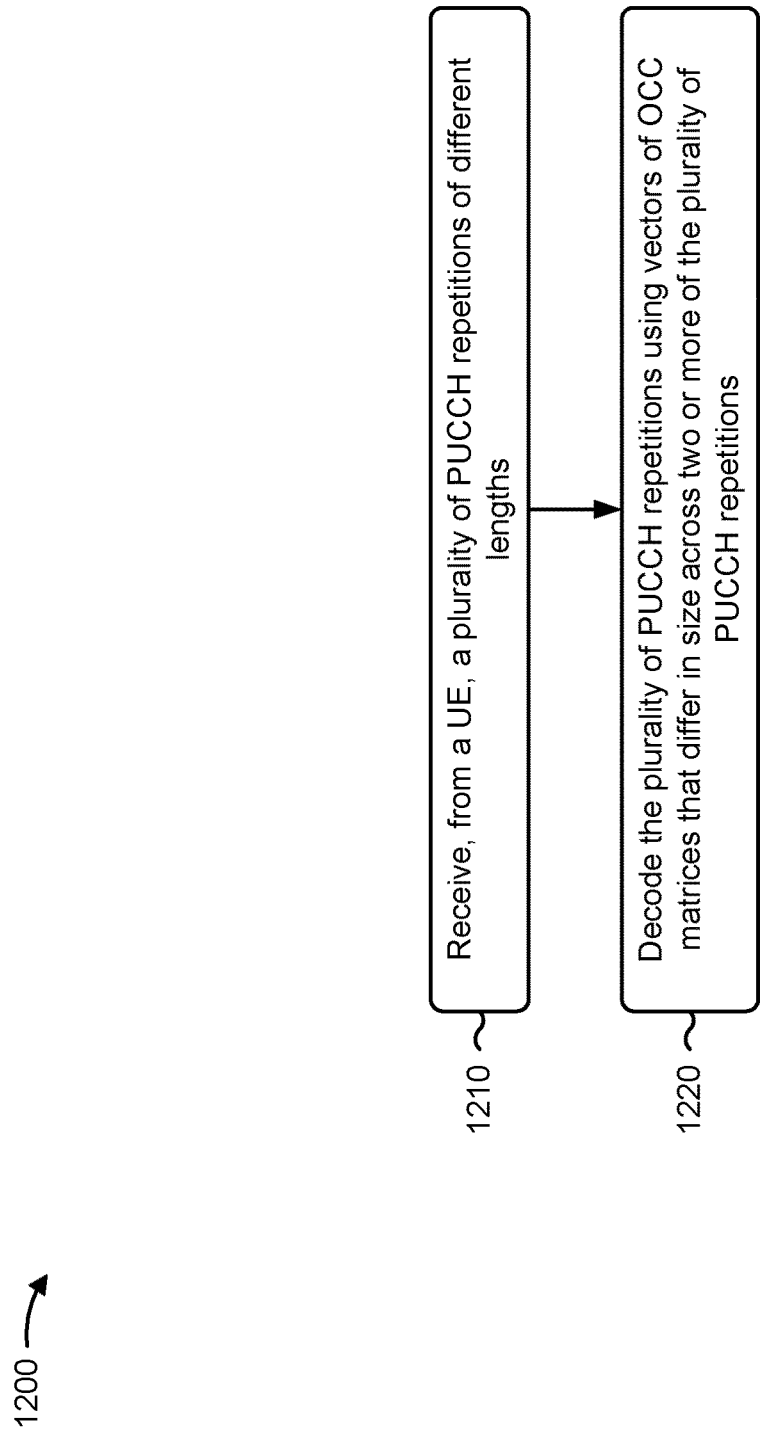
FIG. 12 is a diagram illustrating an example process performed, for example, by a base station, in accordance with the present disclosure.

FIG. 12 is a diagram illustrating an example process 1200 performed, for example, by a base station, in accordance with the present disclosure. Example process 1200 is an example where the base station (e.g., base station 110 depicted in FIGS. 1-2, BS 810 depicted in FIG. 8) performs operations associated with different OCC matrix sizes across PUCCH repetitions. In some aspects, process 1200 may include configuring a UE to use PUCCH repetitions of different lengths.

As shown in FIG. 12, in some aspects, process 1200 may include receiving, from the UE, a plurality of PUCCH repetitions of different lengths (block 1210). For example, the base station (e.g., using reception component 1402 depicted in FIG. 14) may receive, from a UE, a plurality of PUCCH repetitions of different lengths, as described above.

As further shown in FIG. 12, in some aspects, process 1200 may include decoding the plurality of PUCCH repetitions using vectors of OCC matrices that differ in size across two or more of the plurality of PUCCH repetitions (block 1220). For example, the base station (e.g., using decode component 1408 depicted in FIG. 14) may decode the plurality of PUCCH repetitions using vectors of OCC matrices that differ in size across two or more of the plurality of PUCCH repetitions, as described above.

Process 1200 may include additional aspects, such as any single aspect or any combination of aspects described below and/or in connection with one or more other processes described elsewhere herein.

In a first aspect, receiving the plurality of PUCCH repetitions includes receiving a first PUCCH repetition and a second PUCCH repetition, and decoding the plurality of PUCCH repetitions includes determining a first vector of a first OCC matrix of a first size for decoding DMRS symbols of the first PUCCH repetition, and a second vector of a second OCC matrix of a second size for decoding UCI symbols of the first PUCCH repetition, and determining a third vector of a third OCC matrix of a third size, different than the first size, for decoding DMRS symbols of the second PUCCH repetition, and a fourth vector of a fourth OCC matrix of a fourth size for decoding UCI symbols of the second PUCCH repetition.

In a second aspect, alone or in combination with the first aspect, an index value identifying the first vector of the first OCC matrix and an index value identifying the third vector of the third OCC matrix are the same.

In a third aspect, alone or in combination with one or more of the first and second aspects, process 1200 includes transmitting the index value identifying the first vector to the UE.

In a fourth aspect, alone or in combination with one or more of the first through third aspects, an index value identifying the second vector of the second OCC matrix and an index value identifying the fourth vector of the fourth OCC matrix are the same.

In a fifth aspect, alone or in combination with one or more of the first through fourth aspects, a same index value, transmitted to the UE, identifies the first vector, the second vector, the third vector, and the fourth vector.

In a sixth aspect, alone or in combination with one or more of the first through fifth aspects, process 1200 includes determining a maximum quantity of vectors in the first OCC matrix that may be selected for decoding the DMRS symbols of the first PUCCH repetition based at least in part on a minimum size among the first size and the third size.

In a seventh aspect, alone or in combination with one or more of the first through sixth aspects, process 1200 includes selecting a subset of vectors of the first OCC matrix to form a first reduced OCC matrix, where a quantity of the subset of vectors is no greater than the maximum quantity of vectors that may be selected for decoding the DMRS symbols.

In an eighth aspect, alone or in combination with one or more of the first through seventh aspects, the subset of vectors are contiguous vectors in the first OCC matrix.

In a ninth aspect, alone or in combination with one or more of the first through eighth aspects, selecting the subset of vectors includes selecting each vector in the first OCC matrix according to a distributed pattern, and a spacing between vectors in the distributed pattern is based at least in part on a total quantity of vectors in the first OCC matrix divided by the maximum quantity of vectors that may be selected for decoding the DMRS symbols.

In a tenth aspect, alone or in combination with one or more of the first through ninth aspects, a maximum quantity of vectors in the second OCC matrix that may be selected for decoding the UCI symbols of the first PUCCH repetition is equal to the maximum quantity of vectors in the first OCC matrix that may be selected for decoding the DMRS symbols.

In an eleventh aspect, alone or in combination with one or more of the first through tenth aspects, process 1200 includes determining a quantity of vectors in the second OCC matrix that may be selected for decoding the UCI symbols of the first PUCCH repetition based at least in part on a minimum size among the second size and the fourth size.

In a twelfth aspect, alone or in combination with one or more of the first through eleventh aspects, using vectors of OCC matrices that differ in size across two or more of the plurality of PUCCH repetitions includes using vectors of OCC matrices that differ in size across the two or more of the plurality of PUCCH repetitions in connection with transmitting an indication to the UE to use vectors of OCC matrices that differ in size across two or more of the plurality of PUCCH repetitions.

In a thirteenth aspect, alone or in combination with one or more of the first through twelfth aspects, at least one of the OCC matrices is a DFT matrix.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
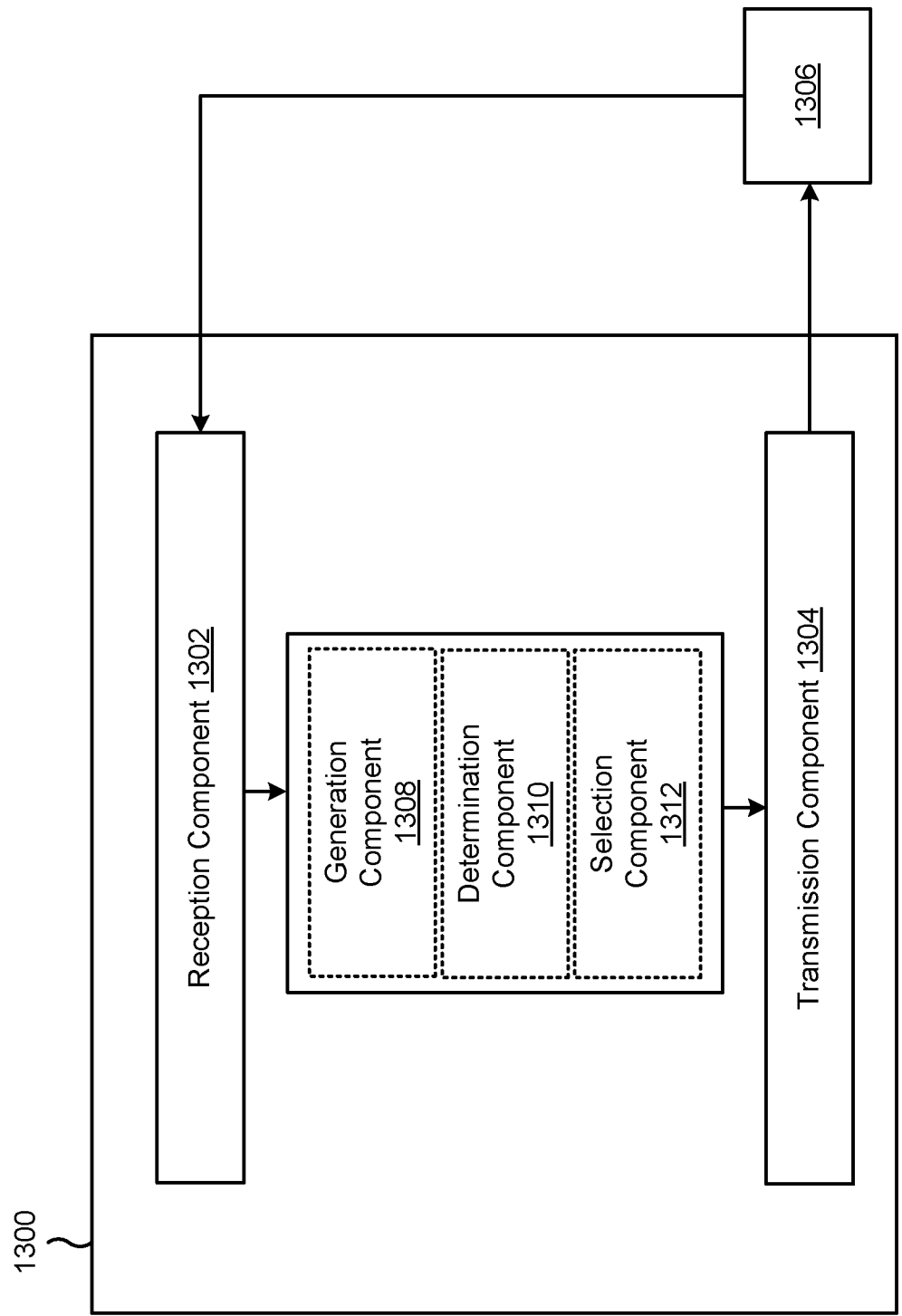
FIG. 13 is a block diagram of an example apparatus for wireless communication, in accordance with the present disclosure.

FIG. 13 is a block diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include one or more of a generation component 1308, a determination component 1310, or a selection component 1312, among other examples.

In some aspects, the apparatus 1300 may be configured to perform one or more operations described herein in connection with FIGS. 3-12. Additionally or alternatively, the apparatus 1300 may be configured to perform one or more processes described herein, such as process 1100 of FIG. 11. In some aspects, the apparatus 1300 and/or one or more components shown in FIG. 13 may include one or more components of the UE described above in connection with FIG. 2. Additionally, or alternatively, one or more components shown in FIG. 13 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the UE described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE described above in connection with FIG. 2. In some aspects, the transmission component 1304 may be co-located with the reception component 1302 in a transceiver.

The generation component 1308 may generate a plurality of PUCCH repetitions of different lengths using vectors of OCC matrices that differ in size across two or more of the plurality of PUCCH repetitions. In some aspects, the generation component 1308 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The transmission component 1304 may transmit the plurality of PUCCH repetitions.

The reception component 1302 may receive the index value identifying the first vector from a base station.

The determination component 1310 may determine a maximum quantity of vectors in the first OCC matrix that may be selected for application to the DMRS symbols of the first PUCCH repetition, based at least in part on a minimum size among the first size and the third size. In some aspects, the determination component 1310 may include a controller/processor, a memory, or a combination thereof, of the UE described above in connection with FIG. 2.

The selection component 1312 may select a subset of vectors of the first OCC matrix to form a first reduced OCC matrix, where a quantity of the subset of vectors is no greater than the maximum quantity of vectors that may be selected for application to the DMRS symbols. In some aspects, the selection component 1312 may include a controller/processor, a memory, or a combination thereof, of the UE described above in connection with FIG. 2.

The determination component 1310 may determine a quantity of vectors in the second OCC matrix that may be selected for application to the UCI symbols of the first PUCCH repetition based at least in part on a minimum size among the second size and the fourth size. The determination component 1310 may determine a maximum quantity of vectors in the first OCC matrix that may be selected for application to the DMRS symbols of the first PUCCH repetition, based at least in part on one or more SFIs.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

Figure 14:
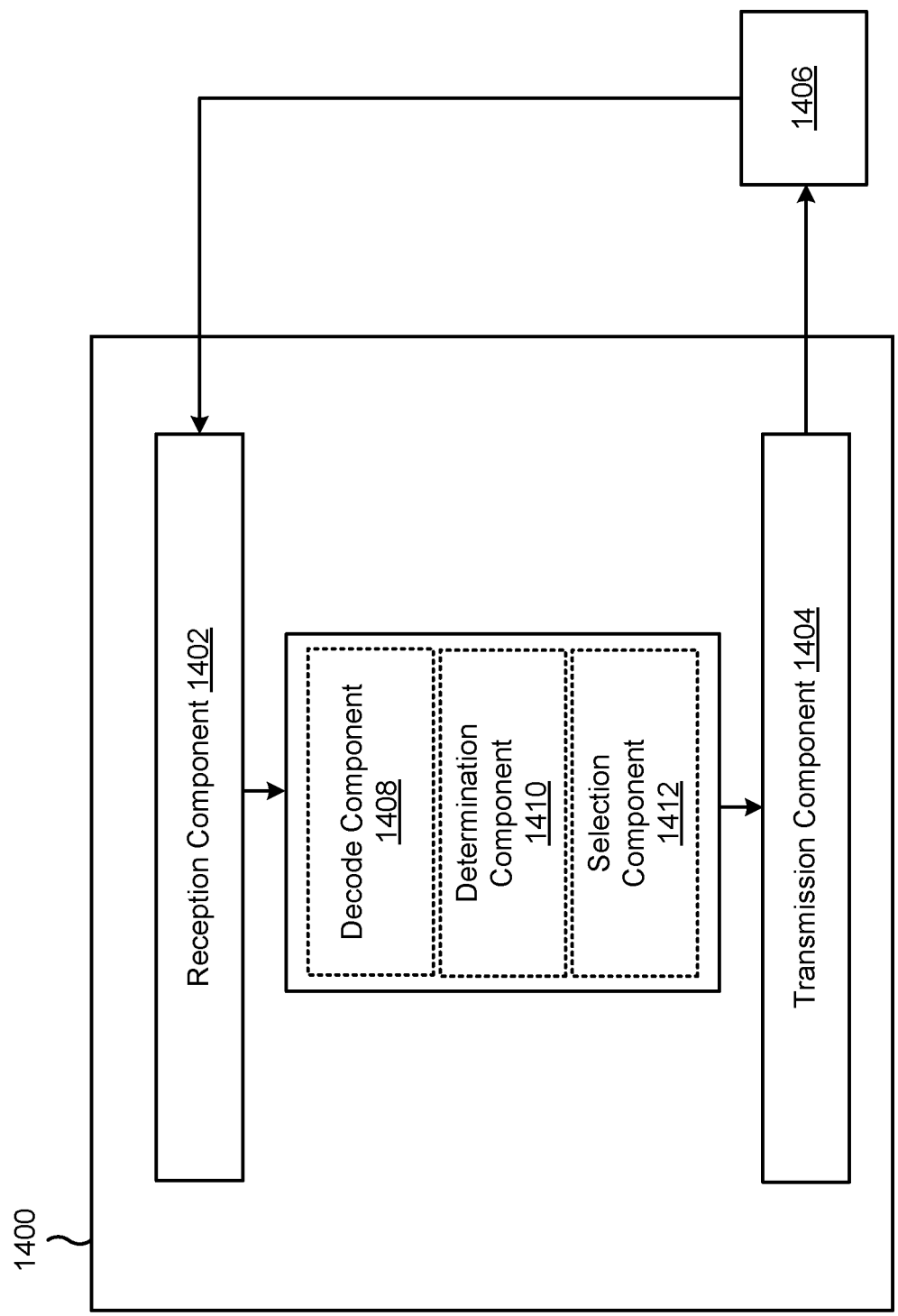
FIG. 14 is a block diagram of an example apparatus for wireless communication, in accordance with the present disclosure.

FIG. 14 is a block diagram of an example apparatus 1400 for wireless communication. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include one or more of a decode component 1408, a determination component 1410, or a selection component 1412, among other examples.

In some aspects, the apparatus 1400 may be configured to perform one or more operations described herein in connection with FIGS. 3-12. Additionally or alternatively, the apparatus 1400 may be configured to perform one or more processes described herein, such as process 1200 of FIG. 12. In some aspects, the apparatus 1400 and/or one or more components shown in FIG. 14 may include one or more components of the base station described above in connection with FIG. 2. Additionally, or alternatively, one or more components shown in FIG. 14 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the base station described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the base station described above in connection with FIG. 2. In some aspects, the transmission component 1404 may be co-located with the reception component 1402 in a transceiver.

The reception component 1402 may receive, from a UE, a plurality of PUCCH repetitions of different lengths. The decode component 1408 may decode the plurality of PUCCH repetitions using vectors of OCC matrices that differ in size across two or more of the plurality of PUCCH repetitions. In some aspects, the decode component 1408 may include a demodulator, a MIMO detector, a receive processor, a controller/processor, a memory, or a combination thereof, of the base station described above in connection with FIG. 2.

The transmission component 1404 may transmit the index value identifying the first vector to the UE.

The determination component 1410 may determine a maximum quantity of vectors in the first OCC matrix that may be selected for decoding the DMRS symbols of the first PUCCH repetition based at least in part on a minimum size among the first size and the third size. In some aspects, the determination component 1410 may include a controller/processor, a memory, or a combination thereof, of the base station described above in connection with FIG. 2.

The selection component 1412 may select a subset of vectors of the first OCC matrix to form a first reduced OCC matrix, where a quantity of the subset of vectors is no greater than the maximum quantity of vectors that may be selected for decoding the DMRS symbols. In some aspects, the selection component 1412 may include a controller/processor, a memory, or a combination thereof, of the base station described above in connection with FIG. 2.

The determination component 1410 may determine a quantity of vectors in the second OCC matrix that may be selected for decoding the UCI symbols of the first PUCCH repetition based at least in part on a minimum size among the second size and the fourth size. In some aspects, the determination component 1410 may include a controller/processor, a memory, or a combination thereof, of the base station described above in connection with FIG. 2.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: generating a plurality of physical uplink control channel (PUCCH) repetitions of different lengths using vectors of orthogonal cover code (OCC) matrices that differ in size across two or more of the plurality of PUCCH repetitions; and transmitting the plurality of PUCCH repetitions.

Aspect 2: The method of Aspect 1, wherein generating the plurality of PUCCH repetitions includes: applying a first vector of a first OCC matrix of a first size to demodulation reference signal (DMRS) symbols of a first PUCCH repetition, and a second vector of a second OCC matrix of a second size to uplink control information (UCI) symbols of the first PUCCH repetition; and applying a third vector of a third OCC matrix of a third size, different than the first size, to DMRS symbols of a second PUCCH repetition, and a fourth vector of a fourth OCC matrix of a fourth size to UCI symbols of the second PUCCH repetition, and wherein transmitting the plurality of PUCCH repetitions includes transmitting the first PUCCH repetition and the second PUCCH repetition.

Aspect 3: The method of Aspect 2, wherein an index value identifying the first vector of the first OCC matrix and an index value identifying the third vector of the third OCC matrix are the same.

Aspect 4: The method of Aspect 3, further comprising receiving the index value identifying the first vector from a base station.

Aspect 5: The method of Aspect 2, wherein an index value identifying the second vector of the second OCC matrix and an index value identifying the fourth vector of the fourth OCC matrix are the same.

Aspect 6: The method of Aspect 2, wherein a same index value, received from a base station, identifies the first vector, the second vector, the third vector, and the fourth vector.

Aspect 7: The method of any of Aspects 2-6, further comprising determining a maximum quantity of vectors in the first OCC matrix that may be selected for application to the DMRS symbols of the first PUCCH repetition, based at least in part on a minimum size among the first size and the third size.

Aspect 8: The method of Aspect 7, further comprising selecting a subset of vectors of the first OCC matrix to form a first reduced OCC matrix, wherein a quantity of the subset of vectors is no greater than the maximum quantity of vectors that may be selected for application to the DMRS symbols.

Aspect 9: The method of Aspect 8, wherein the subset of vectors are contiguous vectors in the first OCC matrix.

Aspect 10: The method of Aspect 8 or 9, wherein selecting the subset of vectors includes selecting each vector in the first OCC matrix according to a distributed pattern, and wherein a spacing between vectors in the distributed pattern is based at least in part on a total quantity of vectors in the first OCC matrix divided by the maximum quantity of vectors that may be selected for application to the DMRS symbols.

Aspect 11: The method of Aspect 7, wherein a maximum quantity of vectors in the second OCC matrix that may be selected for application to the UCI symbols of the first PUCCH repetition is equal to the maximum quantity of vectors in the first OCC matrix that may be selected for application to the DMRS symbols.

Aspect 12: The method of any of Aspects 2-11, further comprising determining a maximum quantity of vectors in the first OCC matrix that may be selected for application to the DMRS symbols of the first PUCCH repetition, based at least in part on one or more slot format indicators.

Aspect 13: The method of any of Aspects 2-12, further comprising determining a quantity of vectors in the second OCC matrix that may be selected for application to the UCI symbols of the first PUCCH repetition based at least in part on a minimum size among the second size and the fourth size.

Aspect 14: The method of any of Aspects 1-13, wherein using vectors of OCC matrices that differ in size across two or more of the plurality of PUCCH repetitions includes using vectors of OCC matrices that differ in size across the two or more of the plurality of PUCCH repetitions in connection with receiving an indication from a base station to use vectors of OCC matrices that differ in size across two or more of the plurality of PUCCH repetitions.

Aspect 15: The method of any of Aspects 1-14, wherein at least one of the OCC matrices is a discrete Fourier transform matrix.

Aspect 16: The method of any of Aspects 1-15, wherein generating the plurality of PUCCH repetitions includes generating the plurality of PUCCH repetitions based at least in part on one or more slot format indicators.

Aspect 17: A method of wireless communication performed by a base station, comprising: receiving, from a user equipment (UE), a plurality of physical uplink control channel (PUCCH) repetitions of different lengths; and decoding the plurality of PUCCH repetitions using vectors of orthogonal cover code (OCC) matrices that differ in size across two or more of the plurality of PUCCH repetitions.

Aspect 18: The method of Aspect 17, further comprising configuring the UE to use PUCCH repetitions of different lengths.

Aspect 19: The method of Aspect 17 or 18, wherein receiving the plurality of PUCCH repetitions includes receiving a first PUCCH repetition and a second PUCCH repetition, and wherein decoding the plurality of PUCCH repetitions includes: determining a first vector of a first OCC matrix of a first size for decoding demodulation reference signal (DMRS) symbols of the first PUCCH repetition, and a second vector of a second OCC matrix of a second size for decoding uplink control information (UCI) symbols of the first PUCCH repetition; and determining a third vector of a third OCC matrix of a third size, different than the first size, for decoding DMRS symbols of the second PUCCH repetition, and a fourth vector of a fourth OCC matrix of a fourth size for decoding UCI symbols of the second PUCCH repetition.

Aspect 20: The method of Aspect 19, wherein an index value identifying the first vector of the first OCC matrix and an index value identifying the third vector of the third OCC matrix are the same.

Aspect 21: The method of Aspect 20, further comprising transmitting the index value identifying the first vector to the UE.

Aspect 22: The method of Aspect 19, wherein an index value identifying the second vector of the second OCC matrix and an index value identifying the fourth vector of the fourth OCC matrix are the same.

Aspect 23: The method of Aspect 19, wherein a same index value, transmitted to the UE, identifies the first vector, the second vector, the third vector, and the fourth vector.

Aspect 24: The method of any of Aspects 19-23, further comprising determining a maximum quantity of vectors in the first OCC matrix that may be selected for decoding the DMRS symbols of the first PUCCH repetition based at least in part on a minimum size among the first size and the third size.

Aspect 25: The method of Aspect 24, further comprising selecting a subset of vectors of the first OCC matrix to form a first reduced OCC matrix, wherein a quantity of the subset of vectors is no greater than the maximum quantity of vectors that may be selected for decoding the DMRS symbols.

Aspect 26: The method of Aspect 25, wherein the subset of vectors are contiguous vectors in the first OCC matrix.

Aspect 27: The method of Aspect 25 or 26, wherein selecting the subset of vectors includes selecting each vector in the first OCC matrix according to a distributed pattern, and wherein a spacing between vectors in the distributed pattern is based at least in part on a total quantity of vectors in the first OCC matrix divided by the maximum quantity of vectors that may be selected for decoding the DMRS symbols.

Aspect 28: The method of Aspect 24, wherein a maximum quantity of vectors in the second OCC matrix that may be selected for decoding the UCI symbols of the first PUCCH repetition is equal to the maximum quantity of vectors in the first OCC matrix that may be selected for decoding the DMRS symbols.

Aspect 29: The method of Aspect 19, further comprising determining a quantity of vectors in the second OCC matrix that may be selected for decoding the UCI symbols of the first PUCCH repetition based at least in part on a minimum size among the second size and the fourth size.

Aspect 30: The method of any of Aspects 17-29, wherein using vectors of OCC matrices that differ in size across two or more of the plurality of PUCCH repetitions includes using vectors of OCC matrices that differ in size across the two or more of the plurality of PUCCH repetitions in connection with transmitting an indication to the UE to use vectors of OCC matrices that differ in size across two or more of the plurality of PUCCH repetitions.

Aspect 31: The method of any of Aspects 17-30, wherein at least one of the OCC matrices is a discrete Fourier transform matrix.

Aspect 32: An apparatus for wireless communication at a device, comprising a processor; memory coupled with the processor; and instructions stored in the memory and executable by the processor to cause the apparatus to perform the method of one or more of Aspects 1-31.

Aspect 33: A device for wireless communication, comprising a memory and one or more processors coupled to the memory, the one or more processors configured to perform the method of one or more of Aspects 1-31.

Aspect 34: An apparatus for wireless communication, comprising at least one means for performing the method of one or more of Aspects 1-31.

Aspect 35: A non-transitory computer-readable medium storing code for wireless communication, the code comprising instructions executable by a processor to perform the method of one or more of Aspects 1-31.

Aspect 36: A non-transitory computer-readable medium storing a set of instructions for wireless communication, the set of instructions comprising one or more instructions that, when executed by one or more processors of a device, cause the device to perform the method of one or more of Aspects 1-31.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to:
        generate a plurality of physical uplink control channel (PUCCH) repetitions of a PUCCH transmission, wherein each PUCCH repetition of the plurality of PUCCH repetitions has a different length, using vectors of orthogonal cover code (OCC) matrices that differ in size across two or more of the plurality of PUCCH repetitions; and
        transmit the plurality of PUCCH repetitions.

2. The UE of claim 1, wherein the one or more processors, to generate the plurality of PUCCH repetitions, are configured to:
    apply a first vector of a first OCC matrix of a first size to demodulation reference signal (DMRS) symbols of a first PUCCH repetition, and a second vector of a second OCC matrix of a second size to uplink control information (UCI) symbols of the first PUCCH repetition; and
    apply a third vector of a third OCC matrix of a third size, different than the first size, to DMRS symbols of a second PUCCH repetition, and a fourth vector of a fourth OCC matrix of a fourth size to UCI symbols of the second PUCCH repetition, and wherein the one or more processors, to transmit the plurality of PUCCH repetitions, are configured to transmit the first PUCCH repetition and the second PUCCH repetition.

3. The UE of claim 2, wherein an index value identifying the first vector of the first OCC matrix and an index value identifying the third vector of the third OCC matrix are the same.

4. The UE of claim 3, wherein the one or more processors are configured to receive the index value identifying the first vector from a base station.

5. The UE of claim 2, wherein an index value identifying the second vector of the second OCC matrix and an index value identifying the fourth vector of the fourth OCC matrix are the same.

6. The UE of claim 2, wherein a same index value, received from a base station, identifies the first vector, the second vector, the third vector, and the fourth vector.

7. The UE of claim 2, wherein the one or more processors are configured to determine a maximum quantity of vectors in the first OCC matrix that may be selected for application to the DMRS symbols of the first PUCCH repetition, based at least in part on a minimum size among the first size and the third size.

8. The UE of claim 7, wherein the one or more processors are configured to select a subset of vectors of the first OCC matrix to form a first reduced OCC matrix, wherein a quantity of the subset of vectors is no greater than the maximum quantity of vectors that may be selected for application to the DMRS symbols.

9. The UE of claim 8, wherein the subset of vectors are contiguous vectors in the first OCC matrix.

10. The UE of claim 8, wherein the one or more processors, to select the subset of vectors, are configured to select each vector in the first OCC matrix according to a distributed pattern, and wherein a spacing between vectors in the distributed pattern is based at least in part on a total quantity of vectors in the first OCC matrix divided by the maximum quantity of vectors that may be selected for application to the DMRS symbols.

11. The UE of claim 7, wherein a maximum quantity of vectors in the second OCC matrix that may be selected for application to the UCI symbols of the first PUCCH repetition is equal to the maximum quantity of vectors in the first OCC matrix that may be selected for application to the DMRS symbols.

12. The UE of claim 2, wherein the one or more processors are configured to determine a maximum quantity of vectors in the first OCC matrix that may be selected for application to the DMRS symbols of the first PUCCH repetition, based at least in part on one or more slot format indicators.

13. The UE of claim 2, wherein the one or more processors are configured to determine a quantity of vectors in the second OCC matrix that may be selected for application to the UCI symbols of the first PUCCH repetition based at least in part on a minimum size among the second size and the fourth size.

14. The UE of claim 1, wherein the one or more processors, to use vectors of OCC matrices that differ in size across two or more of the plurality of PUCCH repetitions, are configured to use vectors of OCC matrices that differ in size across the two or more of the plurality of PUCCH repetitions in connection with receiving an indication from a base station to use vectors of OCC matrices that differ in size across two or more of the plurality of PUCCH repetitions.

15. The UE of claim 1, wherein the one or more processors, to generate the plurality of PUCCH repetitions, are configured to generate the plurality of PUCCH repetitions based at least in part on one or more slot format indicators.

16. A base station for wireless communication, comprising:
a memory; and
one or more processors, coupled to the memory, configured to:
receive, from a user equipment (UE), a plurality of physical uplink control channel (PUCCH) repetitions of a PUCCH transmission, wherein each PUCCH repetition of the plurality of PUCCH repetitions has a different length; and
decode the plurality of PUCCH repetitions using vectors of orthogonal cover code (OCC) matrices that differ in size across two or more of the plurality of PUCCH repetitions.

17. The base station of claim 16, wherein the one or more processors are configured to configure the UE to use PUCCH repetitions of different lengths.

18. The base station of claim 16, wherein the one or more processors, to receive the plurality of PUCCH repetitions, are configured to receive a first PUCCH repetition and a second PUCCH repetition, and wherein the one or more processors, to decode the plurality of PUCCH repetitions, are configured to:
determine a first vector of a first OCC matrix of a first size for decoding demodulation reference signal (DMRS) symbols of the first PUCCH repetition, and a second vector of a second OCC matrix of a second size for decoding uplink control information (UCI) symbols of the first PUCCH repetition; and
determine a third vector of a third OCC matrix of a third size, different than the first size, for decoding DMRS symbols of the second PUCCH repetition, and a fourth vector of a fourth OCC matrix of a fourth size for decoding UCI symbols of the second PUCCH repetition.

19. The base station of claim 18, wherein an index value identifying the first vector of the first OCC matrix and an index value identifying the third vector of the third OCC matrix are the same, and wherein the one or more processors are configured to transmit the index value identifying the first vector to the UE.

20. The base station of claim 18, wherein an index value identifying the second vector of the second OCC matrix and an index value identifying the fourth vector of the fourth OCC matrix are the same.

21. The base station of claim 18, wherein a same index value, transmitted to the UE, identifies the first vector, the second vector, the third vector, and the fourth vector.

22. The base station of claim 18, wherein the one or more processors are configured to determine a maximum quantity of vectors in the first OCC matrix that may be selected for decoding the DMRS symbols of the first PUCCH repetition based at least in part on a minimum size among the first size and the third size.

23. The base station of claim 22, wherein the one or more processors are configured to select a subset of vectors of the first OCC matrix to form a first reduced OCC matrix, wherein a quantity of the subset of vectors is no greater than the maximum quantity of vectors that may be selected for decoding the DMRS symbols.

24. The base station of claim 23, wherein the subset of vectors are contiguous vectors in the first OCC matrix.

25. The base station of claim 23, wherein the one or more processors, to select the subset of vectors, are configured to select each vector in the first OCC matrix according to a distributed pattern, and wherein a spacing between vectors in the distributed pattern is based at least in part on a total quantity of vectors in the first OCC matrix divided by the maximum quantity of vectors that may be selected for decoding the DMRS symbols.

26. The base station of claim 22, wherein a maximum quantity of vectors in the second OCC matrix that may be selected for decoding the UCI symbols of the first PUCCH repetition is equal to the maximum quantity of vectors in the first OCC matrix that may be selected for decoding the DMRS symbols.

27. The base station of claim 18, wherein the one or more processors are configured to determine a quantity of vectors in the second OCC matrix that may be selected for decoding the UCI symbols of the first PUCCH repetition based at least in part on a minimum size among the second size and the fourth size.

28. The base station of claim 18, wherein the one or more processors, to use vectors of OCC matrices that differ in size across two or more of the plurality of PUCCH repetitions, are configured to use vectors of OCC matrices that differ in size across the two or more of the plurality of PUCCH repetitions in connection with transmitting an indication to the UE to use vectors of OCC matrices that differ in size across two or more of the plurality of PUCCH repetitions.

29. A method of wireless communication performed by a user equipment (UE), comprising:
generating a plurality of physical uplink control channel (PUCCH) repetitions of a PUCCH transmission, wherein each PUCCH repetition of the plurality of PUCCH repetitions has a different length, using vectors of orthogonal cover code (OCC) matrices that differ in size across two or more of the plurality of PUCCH repetitions; and
transmitting the plurality of PUCCH repetitions.

30. A method of wireless communication performed by a base station, comprising:
receiving, from a user equipment (UE), a plurality of physical uplink control channel (PUCCH) repetitions of a PUCCH transmission, wherein each PUCCH repetition of the plurality of PUCCH repetitions has a different length; and
decoding the plurality of PUCCH repetitions using vectors of orthogonal cover code (OCC) matrices that differ in size across two or more of the plurality of PUCCH repetitions.

* * * * *